US008121473B2

(12) United States Patent
Muramatsu

(10) Patent No.: US 8,121,473 B2
(45) Date of Patent: Feb. 21, 2012

(54) IMAGING APPARATUS

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 50 days.

(21) Appl. No.: 12/320,182

(22) Filed: Jan. 21, 2009

(65) Prior Publication Data

US 2009/0190911 A1    Jul. 30, 2009

(30) Foreign Application Priority Data

Jan. 25, 2008   (JP) ................. 2008-014841

(51) Int. Cl.
*G03B 7/08*    (2006.01)
(52) U.S. Cl. .......................................... 396/234
(58) Field of Classification Search .................. 396/234
See application file for complete search history.

(56) References Cited

U.S. PATENT DOCUMENTS

| | | | |
|---|---|---|---|
| 5,454,044 A | 9/1995 | Nakajima | |
| 5,608,813 A | 3/1997 | Nakajima | |
| 5,684,533 A * | 11/1997 | Ishii | 348/254 |
| 6,831,695 B1 * | 12/2004 | Tamayama | 348/362 |
| 7,088,390 B2 * | 8/2006 | Mori et al. | 348/254 |
| 2002/0090213 A1 * | 7/2002 | Ohtsuka | 396/234 |
| 2004/0101296 A1 * | 5/2004 | Nakata et al. | 396/65 |
| 2005/0276470 A1 * | 12/2005 | Kim et al. | 382/162 |
| 2007/0189758 A1 * | 8/2007 | Iwasaki | 396/234 |
| 2009/0185055 A1 * | 7/2009 | Ono | 348/234 |
| 2009/0190832 A1 * | 7/2009 | Miyakoshi et al. | 382/173 |

FOREIGN PATENT DOCUMENTS

| | | |
|---|---|---|
| JP | B2-2663189 | 6/1997 |
| JP | A-2002-084455 | 3/2002 |

* cited by examiner

*Primary Examiner* — Christ Mahoney
*Assistant Examiner* — Linda B Smith
(74) *Attorney, Agent, or Firm* — Oliff & Berridge, PLC

(57) ABSTRACT

An imaging apparatus includes a photometry unit dividing a subject into a plurality of regions and performing a photometry, a first calculating unit calculating a first control value based on a photometry result of the photometry unit, a comparing unit comparing the first control value with a maximum value of photometry values in the plurality of regions, a second calculating unit correcting the first control value depending on a comparison result by the comparing unit to calculate a second control value, an image pickup unit picking up an image of the subject according to the second control value and generates an image data, and a third calculating unit calculating a lightness improvement amount for a correction of dark area gradation of the image data depending on the comparison result. Therefore, optimum exposure adjustment and correction of dark area gradation can be performed depending on the subject.

10 Claims, 13 Drawing Sheets

IMAGING APPARATUS

CROSS REFERENCE TO THE RELATED APPLICATIONS

This application is based upon and claims the benefit of priority from Japanese Patent Application No. 2008-014841, filed on Jan. 25, 2008, the entire contents of which are incorporated herein by reference.

BACKGROUND

1. Field

The present application relates to an imaging apparatus which picks up an image of a subject to generate image data.

2. Description of the Related Art

Conventionally, various technologies with regard to exposure adjustment of an imaging apparatus have been devised. For example, in inventions of Japanese Unexamined Patent Application Publication No. 2002-84455, an output level is kept constant by switching a target value of exposure control depending on a selected gradation characteristic when a gradation conversion characteristic is switched.

In addition, a phenomenon has been known in which dark area gradation of image data is 100% black, totally underexposed by shooting a subject having a large difference in luminance. Therefore, in the inventions of Japanese Patent No. 2663189, gradation is compressed by increasing the gain of dark area gradation to improve blackouts thereof.

The inventions of Japanese Unexamined Patent Application Publication No. 2002-84455 employ a constant exposure target value that depends on the gradation conversion characteristic, regardless of a luminance pattern of a subject. Therefore, appropriate exposure adjustment cannot be performed when the optimum exposure adjustment differs in accordance with the luminance pattern of the subject, such as gradation compression of the inventions of the Japanese Patent No. 2663189.

SUMMARY

A proposition of an imaging apparatus is to perform optimum exposure adjustment and correction of dark area gradation depending on the subject.

In order to achieve the above-mentioned proposition, an imaging apparatus includes a photometry unit dividing a subject into a plurality of regions and performing a photometry; a first calculating unit calculating a first exposure control value based on the photometry result of the photometry unit; a comparing unit comparing the first exposure control value with a maximum value of photometry values in the plurality of regions; a second calculating unit correcting the first exposure control value depending on a comparison result by the comparing unit to calculate a second exposure control value; an image pickup unit picking up an image of the subject according to the second exposure control value and generating an image data; and a third calculating unit calculating a lightness improvement amount for a correction of dark area gradation of the image data depending on the comparison result by the comparing unit.

Another imaging apparatus includes a photometry unit dividing a subject into a plurality of regions and performing a photometry; a first calculating unit calculating a first exposure control value based on a photometry result of the photometry unit; a first comparing unit comparing the first exposure control value with a maximum value of photometry values in the plurality of regions; a second calculating unit correcting the first exposure control value depending on a comparison result by the first comparing unit to calculate a second exposure control value; an image pickup unit picking up an image of the subject according to the second exposure control value and generating an image data; a second comparing unit comparing the second exposure control value with a minimum value of photometry values in the plurality of regions; and a third calculating unit calculating a lightness improvement amount for a correction of dark are gradation of the image data, depending on the comparison result by the second comparing unit.

Another imaging apparatus includes a photometry unit dividing a subject into a plurality of regions and performing a photometry; a first calculating unit calculating a first exposure control value based on a photometry result of the photometry unit; a first comparing unit comparing the first exposure control value with a maximum value of photometry values in the plurality of regions; a second comparing unit comparing the first exposure control value with a minimum value of photometry values in the plurality of regions; a second calculating unit correcting the first exposure control value depending on a comparison result by the first comparing unit and a comparison result by the second comparing unit to calculate a second exposure control value; an image pickup unit picking up an image of the subject according to the second exposure control value and generating an image data; and a third calculating unit calculating a lightness improvement amount for a correction of dark are gradation of the image data, depending on the comparison result by the first comparing unit and the comparison result by the second comparing unit.

Here, the imaging apparatus may further includes a correcting unit performing a correction to improve a lightness of dark area gradation of the image data generated in the image pickup unit according to the lightness improvement amount calculated by the third calculating unit, and a recording unit recording the image data after correction by the correcting unit.

In addition, the third calculating unit may provide an upper limit to the lightness improvement amount depending on an imaging sensitivity of the image pickup unit.

In addition, the imaging apparatus may include a light emission part illuminating a subject, and a luminescence amount calculating unit calculating a luminescence amount for a luminescence by the light emission part, wherein the luminescence amount calculating unit may correct the luminescence amount depending on the lightness improvement amount calculated by the third calculating unit.

In addition, the third calculating unit may set the lightness improvement amount as a predefined fixed amount, depending on the shooting condition at time of shooting by the image pickup unit.

In addition, the photometry unit may selectively perform any of a plurality of photometry modes including at least one of a center-weighted photometry mode and a spot photometry mode, and the third calculating unit may set the lightness improvement amount as the fixed amount if any of the center-weighted photometry mode and the spot photometry mode is performed at the photometry unit at time of shooting by the image pickup unit.

In addition, the imaging apparatus may includes a light emission part illuminating a subject, wherein the third calculating unit may set the lightness improvement amount as the fixed amount if an illumination by the light emission part is performed at time of shooting by the image pickup unit.

In addition, the light emission part may selectively perform any of a plurality of luminescence modes including at least one of a daylight synchronous mode and a slow synchronous mode, and the third calculating unit may set the lightness improvement amount as the fixed amount if a luminescence mode other than the center-weighted photometry mode and the spot photometry mode is performed at the light emission part at time of shooting by the image pickup unit.

In addition, the photometry value used for a comparison in the first comparing unit and the photometry value used for a comparison in the second comparing unit may be photometry values acquired from different divided regions at the photometry unit.

DETAILED DESCRIPTION OF THE EMBODIMENTS

First Embodiment

Figure 1:
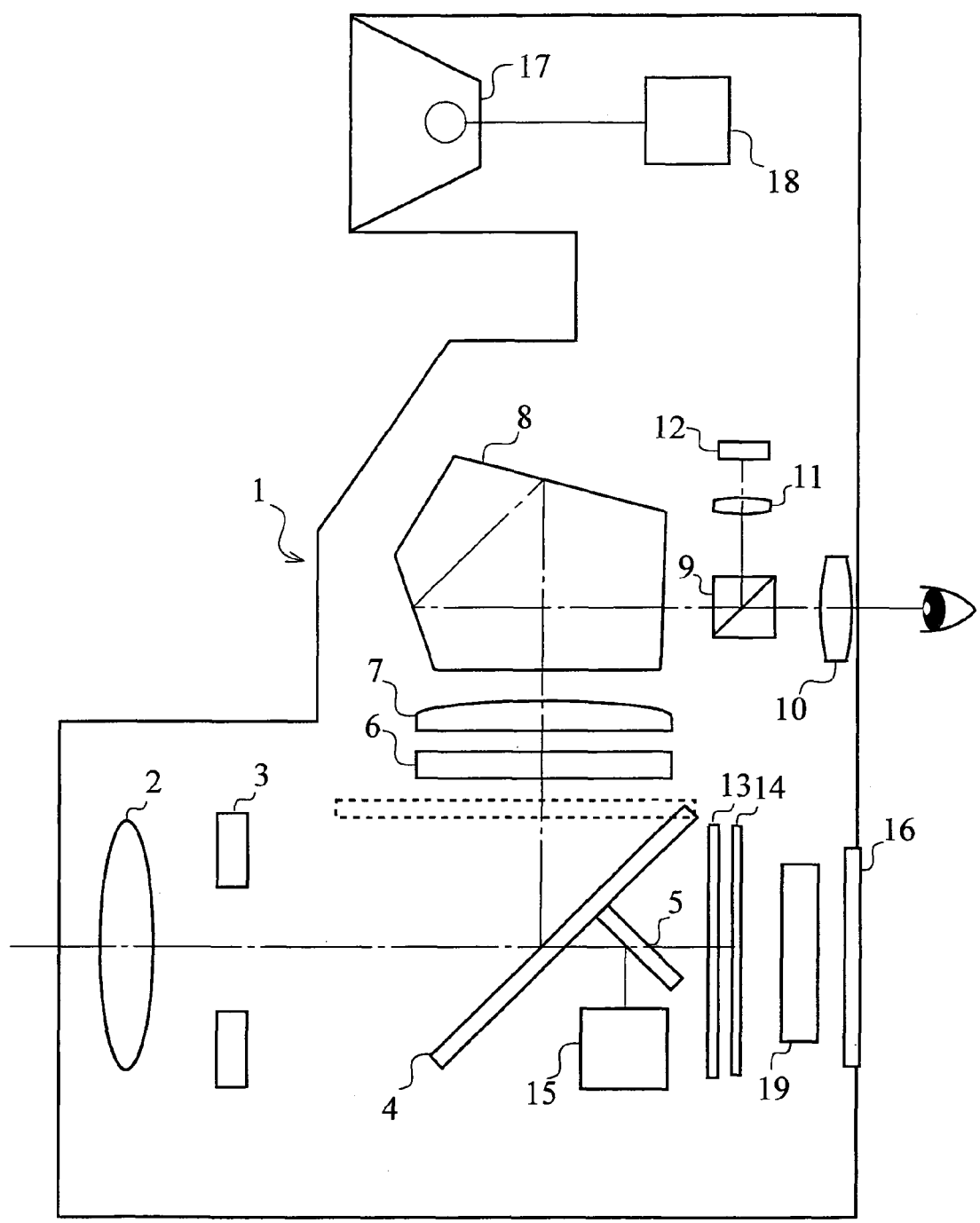
FIG. 1 illustrates a configuration of an electronic camera 1 of a first embodiment.

In the following, a first embodiment will be described referring to the drawings. In the first embodiment, a single-lens reflex type electronic camera is used as an example of an imaging apparatus.

FIG. 1 illustrates a configuration of an electronic camera 1 of the first embodiment. As shown in FIG. 1, the electronic camera 1 includes a photographic lens 2, an aperture diaphragm 3, a quick return mirror 4, a sub mirror 5, a diffusing screen 6, a condenser lens 7, a pentaprism 8, a beam splitter 9, an eyepiece lens 10, an imaging lens 11, a photometry sensor 12, a shutter 13, an image-capturing sensor 14, and a focus detecting part 15.

Figure 2A:
FIG. 2A is an explanatory diagram illustrating a photometry sensor 12.

The photometry sensor 12 is a 24-division photometry sensor shown in FIG. 2A. As for photometry using the photometry sensor 12, there is a plurality of photometry modes such as "divided photometry mode", "center-weighted photometry mode", and "spot photometry mode", one of which being selectively performed. In addition, the image-capturing sensor 14 is a semiconductor device, such as, for example, a CCD (Charge Coupled Device) or a CMOS (Complementary Metal Oxide Semiconductor). The focus detecting part 15 performs phase-difference focus detection, for example, to detect the focused state of the photographic lens 2.

In addition, the electronic camera 1 further includes a monitor 16 such as a liquid crystal monitor which displays an image generated by image pickup; a light emission part 17 which illuminates a subject; a light emission controlling part 18 which controls the light emission part 17; and a controlling part 19 which controls each part. ON/OFF setting of luminescence by the light emission part 17 may be performed manually based on the user's instruction, or may be performed automatically by the controlling part 19. In addition, it is preferred that manual setting and automatic setting can be switched, based on the user's instruction. The controlling part 19 has a memory (not shown) provided therein, on which a program for controlling each part is recorded in advance.

At the time of non-shooting, that is, when shooting is not performed, the quick return mirror 4 is positioned at an angle of 45°, as shown in FIG. 1. Then, a light flux that passed through the photographic lens 2 and the aperture diaphragm 3 is reflected by the quick return mirror 4 and guided to the eyepiece lens 10 through the diffusing screen 6, the condenser lens 7, the pentaprism 8, and the beam splitter 9. The user confirms the image composition by viewing the subject image through the eyepiece lens 10. On the other hand, light flux that is divided upward by the beam splitter 9, is refocused on the image pickup plane of the photometry sensor 12 through the imaging lens 11. In addition, the light flux that transmitted through the quick return mirror 4 is guided to the focus detecting part 15 through the sub mirror 5.

At the time of shooting, on the other hand, the quick return mirror 4 is retracted to the position shown by dashed lines to open the shutter 13, whereby the light flux from the photographic lens 2 is guided to the image-capturing sensor 14.

Figure 3:
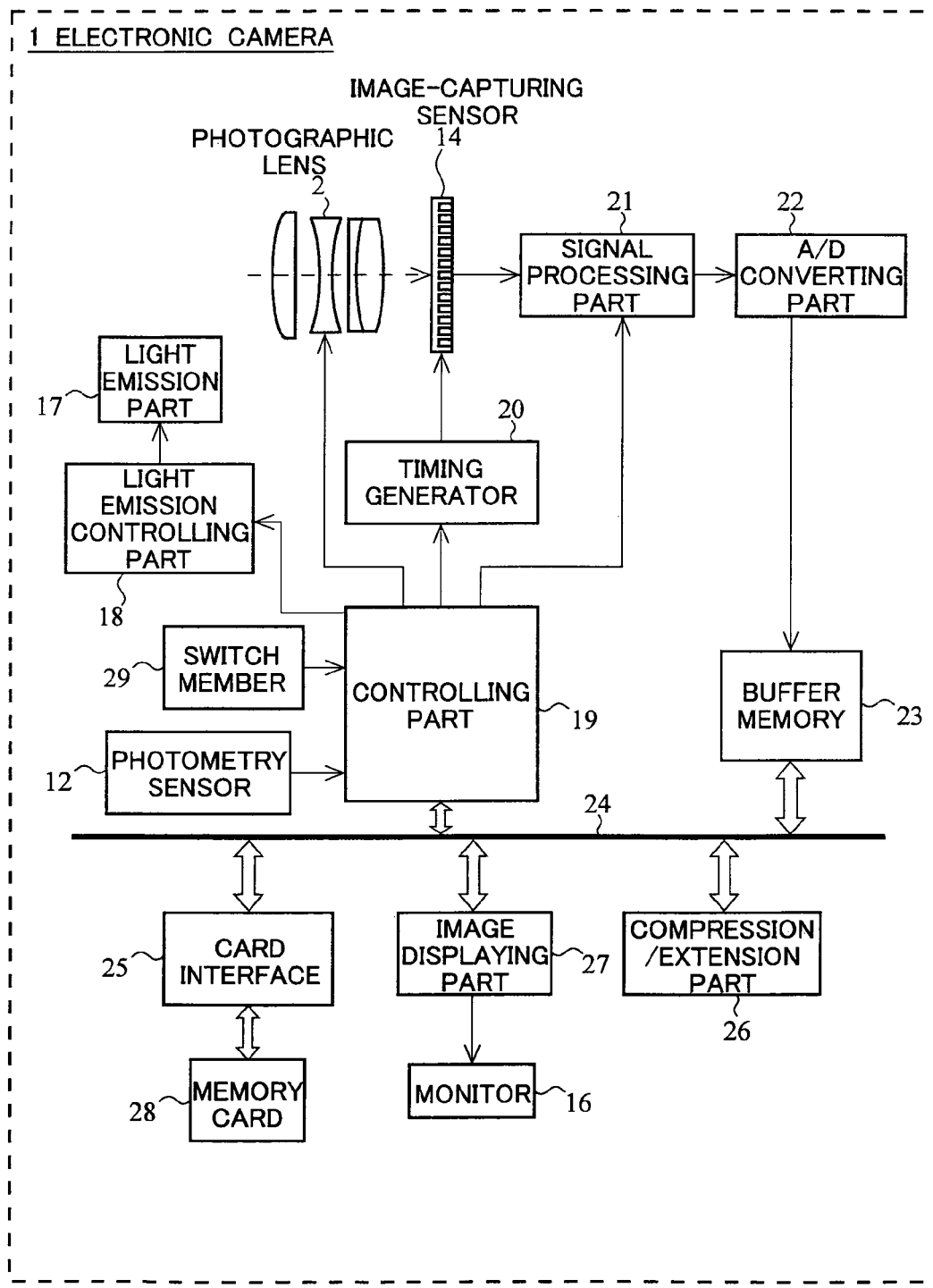
FIG. 3 is a functional block diagram of the electronic camera 1 of the first embodiment.

FIG. 3 is a functional block diagram of the electronic camera 1 of the first embodiment. As shown in FIG. 3, in addition to the configuration of FIG. 1, the electronic camera 1 further includes the following parts: a timing generator 20, a signal processing part 21, an A/D converting part 22, a buffer memory 23, a bus 24, a card interface 25, a compression/expansion part 26, and an image displaying part 27. The timing generator 20 supplies an output pulse to the image-capturing sensor 14. In addition, image data generated by the image-capturing sensor 14 is temporarily stored in the buffer memory 23 through the signal processing part 21 (including a gain adjusting part corresponding to imaging sensitivity) and the A/D converting part 22. The buffer memory 23 is coupled to the bus 24, to which the card interface 25, the controlling part 19 described in FIG. 1, the compression/extension part 26, and the image displaying part 27 are coupled. The card interface 25 is coupled to a detachable memory card 28 and records image data on the memory card 28. In addition, switch members 29 (including release buttons and the like which are not shown) of the electronic camera 1, the timing generator 20, and the photometry sensor 12 are coupled to the controlling part 19. Further, the image displaying part 27 displays an image or the like on the monitor 16 disposed on the back surface of the electronic camera 1.

In addition, the electronic camera 1 includes a gradation non-compression mode in which dark area gradation of the image data is not corrected; and a gradation compression mode in which dark area gradation of the image data is corrected. Which mode to be used at the time of shooting is selected in advance by the user via the switch members 29.

Operation of the electronic camera 1, having the above-described configuration, at the time of shooting will be described with reference to the flow charts shown in FIGS. 4 to 6.

In Step S1, the controlling part 19 performs photometry calculation depending on the photometry result by the photometry sensor 12. The photometry calculation will be described, referring to the flow chart shown in FIG. 5.

In Step S11, the controlling part 19 acquires the result of 24-division photometry from the photometry sensor 12. The photometry sensor 12 performs photoelectric conversion of the incident light, and outputs the 24-division luminance values Bv [1,1] to Bv [6,4] corresponding to each of the divided regions, as shown in FIG. 2A.

Figure 2B:
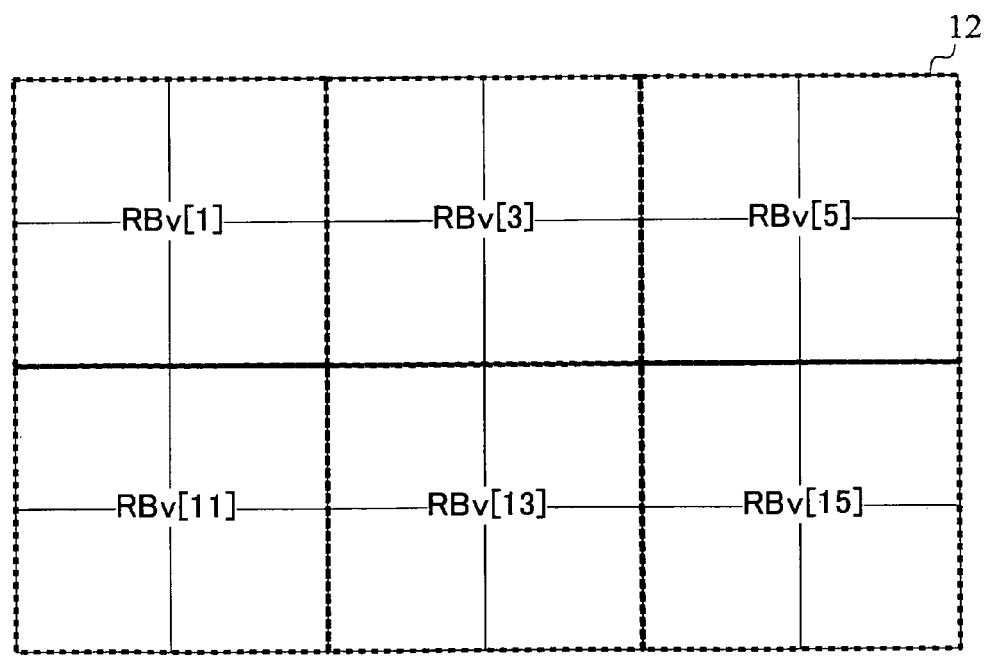
FIG. 2B is an explanatory diagram illustrating the photometry sensor 12.

In Step S12, the controlling part 19 acquires, based on the result of 24-division photometry acquired in Step S11, the result of the 15-division photometry. The controlling part 19 organizes the 24-division luminance values Bv [1,1] to Bv [6,4] acquired in Step S11 into groups of four values each, and acquires the 15-division luminance values RBv [1] to RBv [15]. The 15-division luminance values RBv [1] to RBv [15] are calculated by the following formulas 1 to 15. In addition, a part of the 15 divided regions (RBv [1], RBv [3], RBv [5], RBv [11], RBv [13], and RBv [15]) are shown in FIG. 2B.

$$RBv[1]=(Bv[1,1]+Bv[2,1]+Bv[1,2]+Bv[2,2])/4 \quad \text{(formula 1)}$$

$$RBv[2]=(Bv[2,1]+Bv[3,1]+Bv[2,2]+Bv[3,2])/4 \quad \text{(formula 2)}$$

$$RBv[3]=(Bv[3,1]+Bv[4,1]+Bv[3,2]+Bv[4,2])/4 \quad \text{(formula 3)}$$

$$RBv[4]=(Bv[4,1]+Bv[5,1]+Bv[4,2]+Bv[5,2])/4 \quad \text{(formula 4)}$$

$$RBv[5]=(Bv[5,1]+Bv[6,1]+Bv[5,2]+Bv[6,2])/4 \quad \text{(formula 5)}$$

$$RBv[6]=(Bv[1,2]+Bv[2,2]+Bv[1,3]+Bv[2,3])/4 \quad \text{(formula 6)}$$

$$RBv[7]=(Bv[2,2]+Bv[3,2]+Bv[2,3]+Bv[3,3])/4 \quad \text{(formula 7)}$$

$$RBv[8]=(Bv[3,2]+Bv[4,2]+Bv[3,3]+Bv[4,3])/4 \quad \text{(formula 8)}$$

$$RBv[9]=(Bv[4,2]+Bv[5,2]+Bv[4,3]+Bv[5,3])/4 \quad \text{(formula 9)}$$

$$RBv[10]=(Bv[5,2]+Bv[6,2]+Bv[5,3]+Bv[6,3])/4 \quad \text{(formula 10)}$$

$$RBv[11]=(Bv[1,3]+Bv[2,3]+Bv[1,4]+Bv[2,4])/4 \quad \text{(formula 11)}$$

$$RBv[12]=(Bv[2,3]+Bv[3,3]+Bv[2,4]+Bv[3,4])/4 \quad \text{(formula 12)}$$

$$RBv[13]=(Bv[3,3]+Bv[4,3]+Bv[3,4]+Bv[4,4])/4 \quad \text{(formula 13)}$$

$$RBv[14]=(Bv[4,3]+Bv[5,3]+Bv[4,4]+Bv[5,4])/4 \quad \text{(formula 14)}$$

$$RBv[15]=(Bv[5,3]+Bv[6,3]+Bv[5,4]+Bv[6,4])/4 \quad \text{(formula 15)}$$

In Step S13, the controlling part 19 calculates, based on the photometry result acquired in Step S11 and Step S12, the average luminance value BvMean, the maximum luminance value BvMax15, the minimum luminance value BvMin15, the median luminance value BvC of the 15-division luminance values RBv, and the maximum luminance value BvMax24 of the 24-division luminance values Bv as the characteristic amount. Each value is acquired by each of the following formulas.

$$BvMean = \left(\sum_{i=1}^{15} RBv[i]\right)/15 \quad \text{(formula 16)}$$

$$BvMax15 = MAX(RBv[1] \text{ to } RBv[15]) \quad \text{(formula 17)}$$

$$BvMin15 = MIN(RBv[1] \text{ to } RBv[15]) \quad \text{(formula 18)}$$

$$BvC = RBv[8] \quad \text{(formula 19)}$$

$$BvMax24 = MAX(Bv[1,1] \text{ to } Bv[6,4]) \quad \text{(formula 20)}$$

In Step S14, the controlling part 19 calculates, based on each value calculated in Step S13, an exposure control value BvCntl0. The exposure control value BvCntl0 is acquired by the next formula.

$$BvCntl0 = k1 \cdot BvMean + k2 \cdot BvMax15 + k3 \cdot BvMin15 + k4 \cdot BvC + k5 \quad \text{(formula 21)}$$

In formula 21, k1 to k4 are coefficients indicating the weight of each term. In addition, k5 is a constant term. k1 to k5 are numbers depending on the average luminance value BvMean, and determined in advance so that a better image can be obtained in various sample scenes. An example of k1 to k5 is shown in the following Table 1.

|  | k1 | k2 | k3 | k4 | k5 |
|---|---|---|---|---|---|
| BvMean ≦ Bv4 | 0.4 | 0.1 | 0.2 | 0.3 | 0.3 |
| Bv4 < BvMean | 0.2 | 0.2 | 0.3 | 0.3 | −0.3 |

In Step S15, the controlling part 19 compares the exposure control value BvCntl0 calculated in Step S14 with the maximum luminance value BvMax24 of the 24-division luminance values Bv. Using the next formula, the controlling part 19 acquires dHi, i.e. the value such that the difference between the exposure control value BvCntl0 and the maximum luminance value BvMax24 of the 24-division luminance values Bv exceeds a predefined value thHi.

$$dHi = BvMax24 - BvCntl0 - thHi \quad \text{(formula 22)}$$

In formula 22, the predefined value thHi, an amount at which the highlight part of the image is estimated to saturate, is around 2 Ev to 3 Ev, for example. This predefined value thHi is chosen as the optimum value according to the saturation level of the image-capturing sensor 14 which is an image sensor, and the pixel size of the photometry sensor 12.

In Step S16, the controlling part 19 calculates, based on the comparison result in Step S15, a highlight recovery amount HiRcv. The controlling part 19 finds the highlight recovery amount HiRcv using the next formula.

$$HiRcv = \begin{cases} 0 & dHi < 0 \\ dHi & 0 \leq dHi \leq thdHi \\ thdHi & thdHi < dHi \end{cases} \quad \text{(formula 23)}$$

In formula 23, thdHi is a predefined threshold value indicating an amount at which highlight recovery is possible, depending on the size of dynamic range of the image-capturing sensor 14 which is an image sensor.

As shown in formula 23, the controlling part 19 clips dHi, i.e. the value acquired in Step S15 such that the difference between the exposure control value BvCntl0 and the maximum luminance value BvMax24 of the 24-division luminance values Bv exceeds a predefined value thHi, in between zero and a threshold value thdHi to provide the highlight recovery amount HiRcv.

However, when the image-capturing sensor 14 is configured at a high ISO sensitivity, there is a risk that noise increases and a dynamic range becomes insufficient. Therefore, an upper limit may be provided on the highlight recovery amount HiRcv acquired by formula 23 to provide a relatively small correction, when the image-capturing sensor 14 is configured at high ISO sensitivity. Alternatively, the threshold value thdHi may be set smaller when the image-capturing sensor 14 is configured at high ISO sensitivity.

Furthermore, it may be arranged such that the predicted amount of noise occurrence at the time of shooting is detected as appropriate, and an upper limit is provided on the highlight recovery amount HiRcv, or the above-mentioned threshold value thdHi is decreased, depending on the detection result.

In Step S17, the controlling part 19 corrects, based on the highlight recovery amount HiRcv calculated in Step S16, the exposure control value BvCntl0 calculated in Step S14. Correction of the exposure control value BvCntl0 is performed by the next formula.

$$\text{Exposure control value } BvCntl1 \text{ after correction}=BvCntl0+HiRcv \qquad \text{(formula 24)}$$

Here, the normal exposure control value is employed when the photometry mode is the "center-weighted photometry mode" or the "spot photometry mode", other than the "divided photometry mode", while using a fixed value HiRcvConst with regard to the highlight recovery amount HiRcv.

Figure 4:
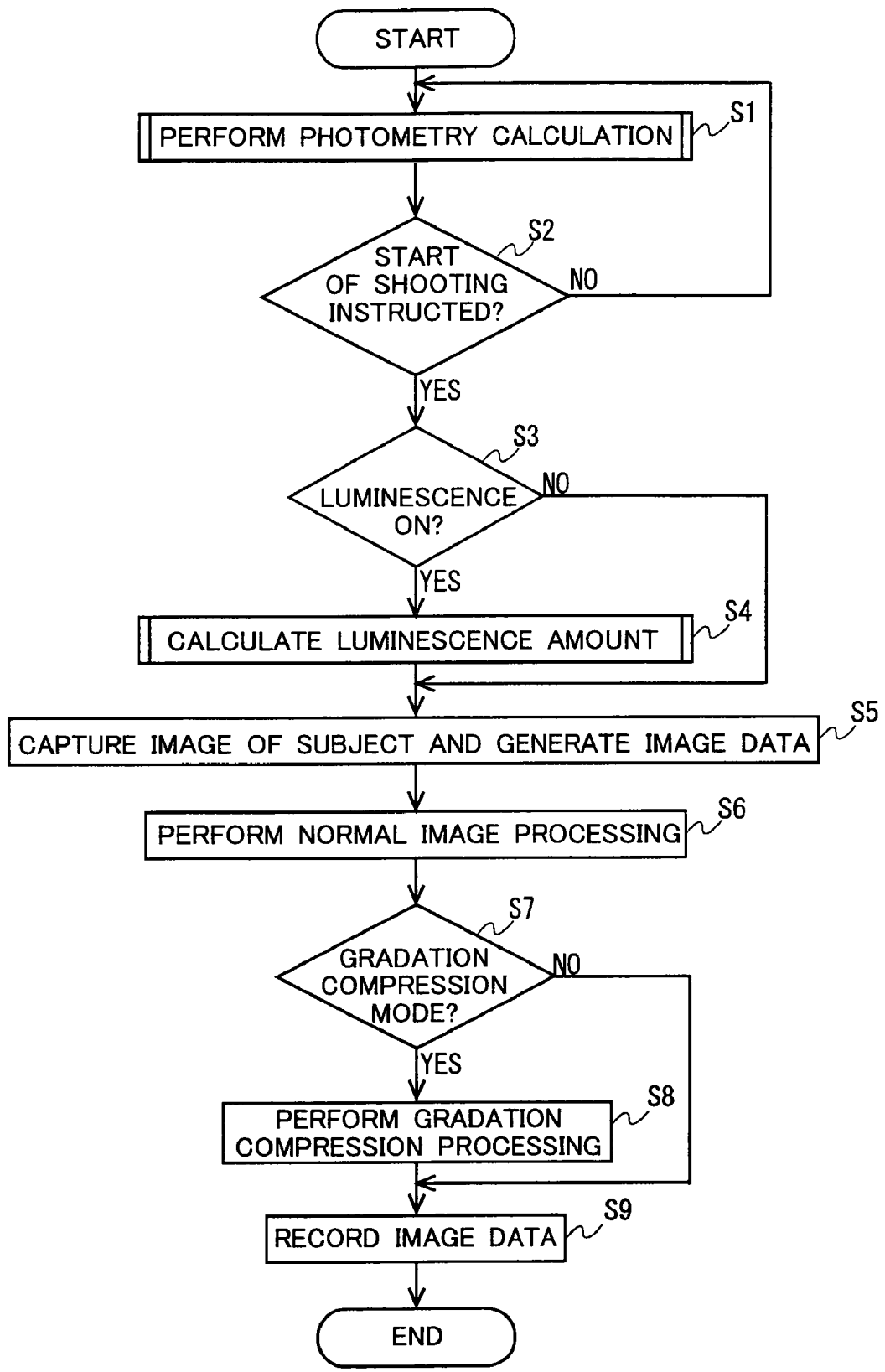
FIG. 4 is a flow chart illustrating the operation at the time of shooting by the electronic camera 1 of the first embodiment.

Having performed the photometry calculation described above, the controlling part 19 proceeds to Step S2 of FIG. 4.

In Step S2, the controlling part 19 determines whether or not start of shooting is instructed by the user through the switch members 29. The controlling part 19 repeats the photometry calculation described at Step S1 until determining that the start of shooting is instructed and, upon determining that the start of shooting is instructed, proceeds to Step S3.

In Step S3, the controlling part 19 determines whether or not luminescence by the light emission part 17 is ON. Upon determining that luminescence by the light emission part 17 is ON, the controlling part 19 proceeds to Step S4. On the other hand, upon determining that luminescence by the light emission part 17 is not ON (luminescence by the light emission part 17 is OFF), the controlling part 19 proceeds to Step S5 described below.

In Step S4, the controlling part 19 calculates the luminescence amount. Calculation of the luminescence amount will be described using the flow chart shown in FIG. 6.

In Step S21, the controlling part 19 controls the light emission controlling part 18 to perform monitor luminescence by the light emission part 17. The luminescence amount in this occasion is a predefined small luminescence amount.

In Step S22, the controlling part 19 acquires photometry result from the photometry sensor 12. The photometry result contains fixed light components. The photometry sensor 12 performs photoelectric conversion on the incident light and outputs 24-division luminance values Bv [1,1] to Bv [6,4] corresponding to each of the divided regions as shown in FIG. 2A. Here, the controlling part 19 may acquire 15-division luminance values RBv [1] to RBv [15], in place of the 24-division luminance values Bv [1,1] to Bv [6,4].

In Step S23, the controlling part 19 calculates, based on the luminance values Bv [1,1] to Bv [6,4] acquired in Step S22, the amount of received reflected light other than the above-mentioned fixed light components.

In Step S24, the controlling part 19 calculates, based on the amount of received reflected light calculated in Step S23, the luminescence amount IL in the light emission part 17. A specific method of calculating the luminescence amount IL is similar to that of a known technology.

In Step S25, the controlling part 19 determines whether or not a gradation compression mode has been entered. Upon determining that the gradation compression mode has been entered, the controlling part 19 proceeds to Step S26. On the other hand, upon determining that the gradation compression mode has not been entered (gradation non-compression mode has been entered), the controlling part 19 terminates the processing of luminescence amount calculation and proceeds to Step S5 in FIG. 4.

In Step S26, the controlling part 19 corrects, based on the highlight recovery amount HiRcv (see Step S16 of FIG. 5) acquired in the photometry calculation, the luminescence amount IL calculated in Step S24. Correction of the luminescence amount IL is performed by the next formula.

$$IL \text{ after correction}=IL \cdot 2^{-HiRcv} \qquad \text{(formula 25)}$$

In other words, correction to decrease the luminescence amount IL based on the highlight recovery amount HiRcv is performed by correcting, according to formula 25, the luminescence amount IL calculated in Step S24.

However, there may be a case in which an actual exposure control value is different from the exposure control value BvCntl1 acquired by the above-mentioned photometry calculation (see Step S17 of FIG. 5) when shutter speed is automatically limited in order to prevent camera shake. Therefore, in such a case, a fixed value HiRcvConst is used in place of the highlight recovery amount HiRcv in formula 25. In addition, it is similar to cases such as limitation by camera shake, or strobe X contact point limitation by strobe speed of the light emission part 17.

Having performed the luminescence amount calculation described above, the controlling part 19 proceeds to Step S5 of FIG. 4. Here, if it is determined in Step S25 that the gradation compression mode has not been entered (gradation non-compression mode has been entered), the luminescence amount IL calculated in Step S24 is used in subsequent processings without any correction.

Having completed the calculation of luminescence amount, the controlling part 19 controls each part in Step S5 to capture an image of the subject by the image-capturing sensor 14 and generate image data, based on the result of photometry calculation performed in Step S1. Here, the controlling part 19 controls the light emission controlling part 18 and causes the light emission part 17 to emit light in synchronization with the image capturing, if it is determined in Step S3 that luminescence is ON. The luminescence is performed based on the result of calculation of the luminescence amount performed in Step S4. Then, the image data generated by the image-capturing sensor 14 is temporarily stored in the buffer memory 23 via the signal processing part 21 and A/D converting part 22.

In Step S6, the controlling part 19 reads out image data from the buffer memory 23 to perform a normal image processing. The normal image processing includes, white balance adjustment, interpolation, hue correction, gradation conversion, or the like. Since a specific method of the processing is similar to that of known technology, description thereof is omitted.

In Step S7, the controlling part 19 determines whether or not the gradation compression mode has been entered. Upon determining that the gradation compression mode has been entered, the controlling part 19 proceeds to Step S8. On the other hand, upon determining that the gradation compression mode has not been entered (gradation non-compression mode has been entered), the controlling part 19 proceeds to Step S9 described below.

In Step S8, the controlling part 19 performs gradation compression processing on the image data which has gone through the normal image processing in Step S6.

Figure 7:
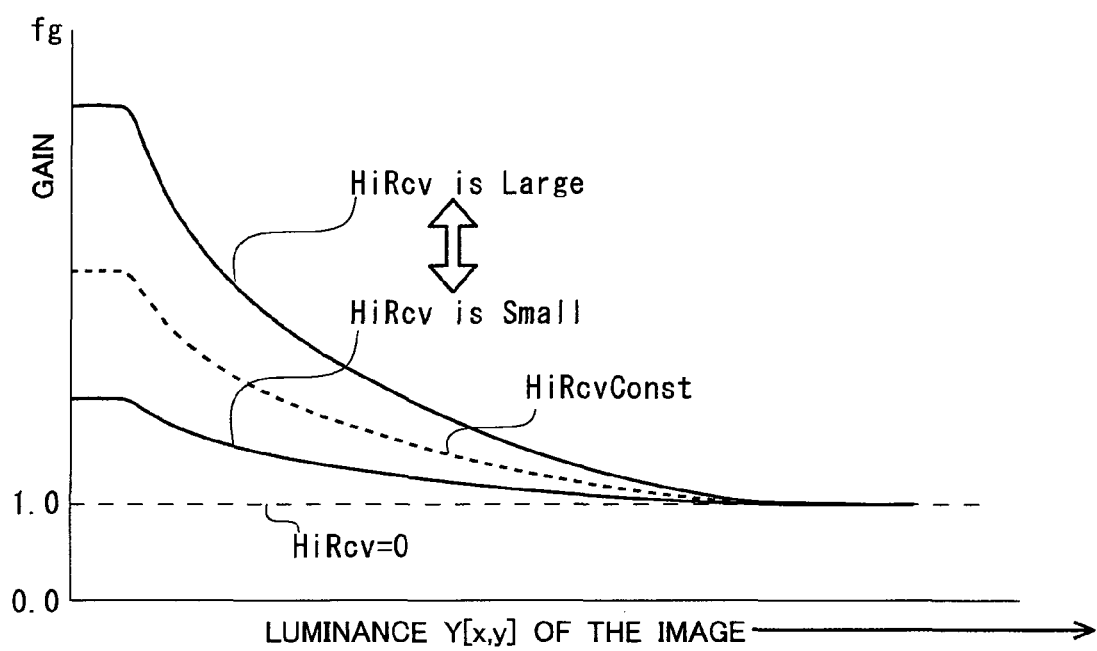
FIG. 7 is a graph showing a gain increasing function fg of gradation compression of the first embodiment.

FIG. 7 is a graph showing a gain increasing function fg of gradation compression. The gain increasing function fg has a gain that depends on the luminance Y of the image, as shown in FIG. 7. The smaller the luminance Y becomes (the darker the neighboring range including the pixel to be processed is), the larger the gain increasing function fg will grow. On the contrary, the larger the luminance Y becomes (the lighter the neighboring range including the pixel to be processed is), the closer to one the gain increasing function fg approaches.

The controlling part 19 acquires, based on the highlight recovery amount HiRcv (see Step S16 of FIG. 5) acquired in the photometry calculation described above, the gain increasing function fg and increases the gain of the dark area region according to the lightness of the vicinity of pixels of interest x and y in a manner described below.

In FIG. 7, the gain increasing function fg is illustrated for cases in which the highlight recovery amount HiRcv is large and the highlight recovery amount HiRcv is small. A plurality of gain increasing functions fg may be prepared in advance, depending on the highlight recovery amount HiRcv, or only the gain increasing function fg having the largest gain increase may be prepared to calculate appropriate gain increasing function in the range between the gain increasing function fg having the largest gain increase and the gain of one.

In addition, when it is determined in Step S7 that the gradation compression mode has not been entered (gradation non-compression mode has been entered), the gain increasing function fg of FIG. 7 indicating HiRcv=0 is used if the gradation compression processing cannot be skipped due to configuration of the processing circuit within the controlling part 19.

Gradation compression calculation in each of the pixels R [x,y], G [x,y], and B [x,y] is performed by the following formulas 26 to 29.

$$Y[x, y] = kr \cdot R[x, y] + kg \cdot G[x, y] + kb \cdot B[x, y] \quad \text{(formula 26)}$$

$$Rc[x, y] = \\ R[x, y] \cdot fg\left\{\sum_{i=-d}^{d}\sum_{j=-d}^{d}\left(Y[x+i, y+j] \cdot Lpw\left[(i^2+j^2)^{1/2}\right]\right)\right\} \quad \text{(formula 27)}$$

$$Gc[x, y] = \\ G[x, y] \cdot fg\left\{\sum_{i=-d}^{d}\sum_{j=-d}^{d}\left(Y[x+i, y+j] \cdot Lpw\left[(i^2+j^2)^{1/2}\right]\right)\right\} \quad \text{(formula 28)}$$

$$Bc[x, y] = \\ B[x, y] \cdot fg\left\{\sum_{i=-d}^{d}\sum_{j=-d}^{d}\left(Y[x+i, y+j] \cdot Lpw\left[(i^2+j^2)^{1/2}\right]\right)\right\} \quad \text{(formula 29)}$$

Figure 8:
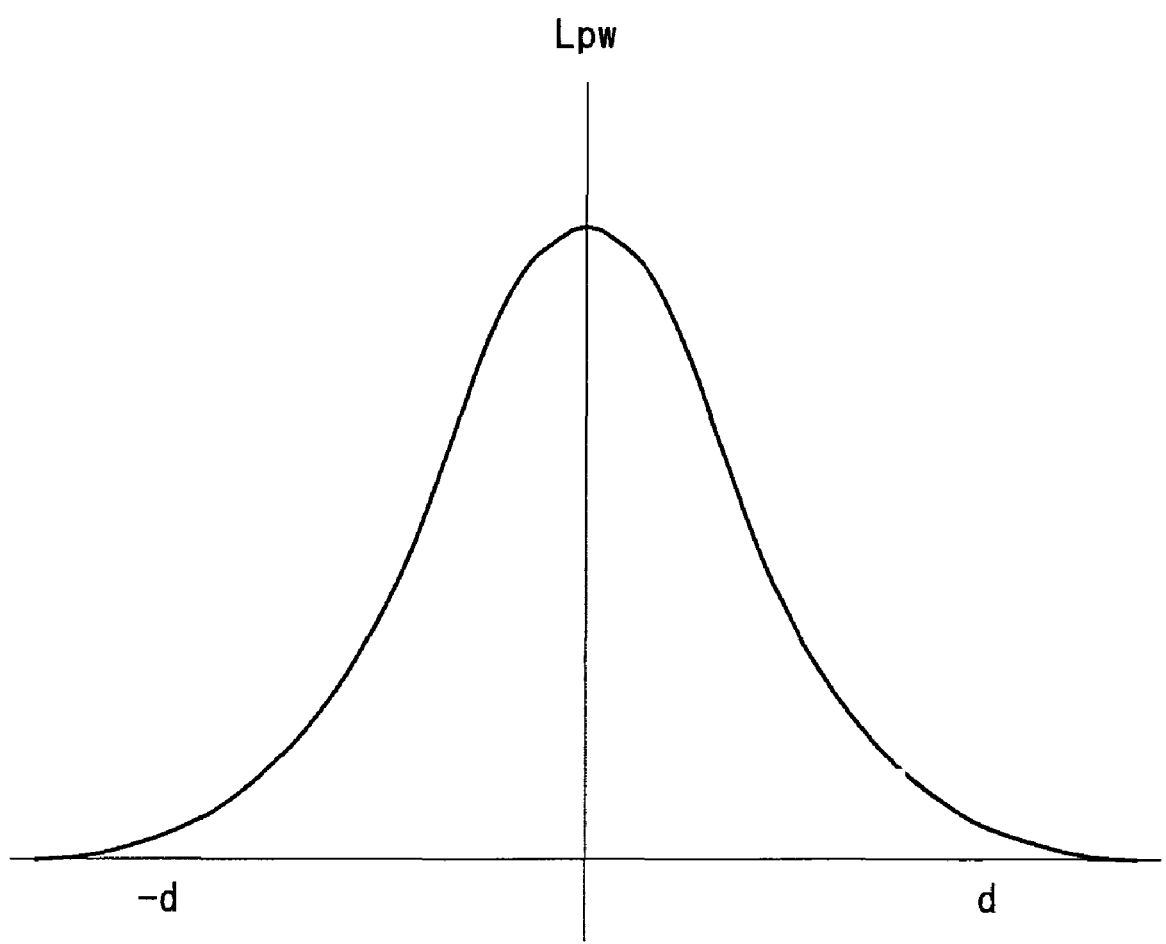
FIG. 8 illustrates the characteristic of a low-pass filter.

Y in formulas 26 to 29 indicates the luminance value of a pixel of interest. In addition, kr, kg and kb in formula 26 are predefined coefficients. Additionally, Lpw in formulas 27 to 29 is the low-pass filter around a pixel of interest, the low-pass filter having the characteristic shown in FIG. 8. Moreover, fg in formulas 27 to 29 corresponds to the above-mentioned gain increasing function fg.

In Step S9, the controlling part 19 records image data that has gone through the gradation compression processing in Step S8, or image data that has gone through the normal image processing in Step S6 into the memory card 28 via the card interface 25, and terminates the series of processings. Here, the image data may be subjected to image compression processing (JPEG compression processing or the like), if necessary, before recording the image data into the memory card 28 via the compression/expansion part 26.

As thus described, according to the first embodiment, photometry is performed with the subject being divided into a plurality of regions and a first exposure control value is calculated, based on the photometry result. Then, the first exposure control value is compared with the maximum value of the photometry values in the plurality of regions, and the first exposure control value is corrected according to the comparison result to calculate a second exposure control value. Furthermore, an image of the subject is captured according to the second exposure control value to generate image data and, depending on the above-mentioned comparison result, the lightness improvement amount when correcting the dark area gradation of the image data generated by the image capturing is calculated. Therefore, exposure can be optimally adjusted depending on the subject, and the lightness improvement amount can be acquired to perform the optimum correction of the dark area gradation.

In addition, according to the first embodiment, lightness of dark area gradation of the image data generated by image capturing is improved according to the calculated lightness improvement amount, and the image data after correction is recorded. Therefore, dark area gradation can be optimally corrected, depending on the subject.

In addition, according to the first embodiment, an upper limit is provided to the above-mentioned lightness improvement amount, depending on the imaging sensitivity in the image pickup unit. Therefore, over-correction of the dark area gradation such that degradation of image quality occurs can be prevented.

In addition, according to the first embodiment, the electronic camera includes a light emission part which illuminates a subject and a luminescence amount calculating unit which calculates luminescence amount for luminescence by the light emission part to correct the luminescence amount calculated by the luminescence amount calculating unit, depending on the lightness improvement amount. Therefore, image capturing can be performed with the optimum luminescence amount according to correction of dark area gradation, at the time of luminescence by the light emission part.

In addition, according to the first embodiment, the lightness improvement amount is set as a predefined fixed amount, depending on the shooting condition at the time of shooting. Therefore, an appropriate lightness improvement amount can be acquired, depending on the shooting condition.

In addition, according to the first embodiment, the lightness improvement amount is provided as a fixed amount if any of the center-weighted photometry mode or the spot photometry mode is performed in photometry unit at the time of shooting. Therefore, an appropriate lightness improvement amount can be acquired, according to the photometry mode.

In addition, according to the first embodiment, an appropriate lightness improvement amount is provided as a fixed amount if illumination is performed by the light emission part at the time of shooting. Therefore, an appropriate lightness improvement amount can be acquired, depending on the presence or absence of luminescence by the light emission part.

Here, in the first embodiment, it may be arranged such that a fixed value HiRcvConst is used as the highlight recovery amount HiRcv, if luminescence ON (YES in Step S3 of FIG. 4). If, however, the luminescence mode is "daylight synchronous mode" or "slow synchronous mode", it is preferred that the highlight recovery amount HiRcv is calculated in the above-mentioned manner. As thus described, an appropriate lightness improvement amount can be acquired according to the luminescence mode, by providing the lightness improvement amount as a fixed amount depending on presence/absence of luminescence or the luminescence mode.

Second Embodiment

In the following, a second embodiment will be described referring to the drawings. The second embodiment is a variation of the first embodiment. Additionally, in the second embodiment, only the elements that are different from the first embodiment will be described, while elements similar to those of the first embodiment will be described using similar symbols or the like as with the first embodiment.

The electronic camera of the second embodiment includes a similar configuration (see FIGS. 1 to 3) as with the electronic camera 1 described in the first embodiment.

Operation of the electronic camera 1 of the second embodiment at the time of shooting is basically similar to that of the first embodiment. In the following, only the different points will be described.

Figure 9:
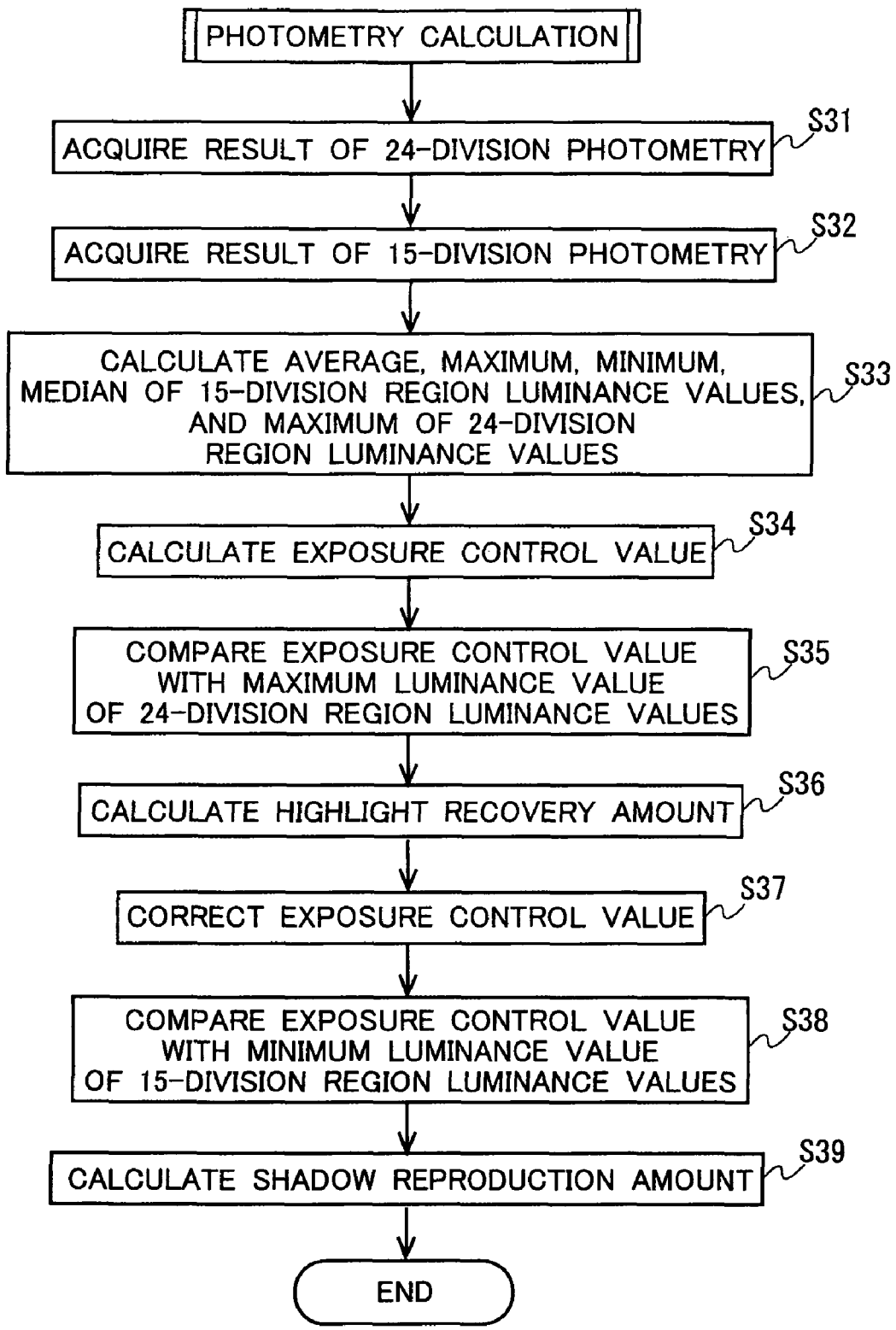
FIG. 9 is a flow chart illustrating the operation at the time of shooting by the electronic camera 1 of a second embodiment.

FIG. 9 is a flow chart illustrating the operation at the time of photometry calculation.

Figure 5:
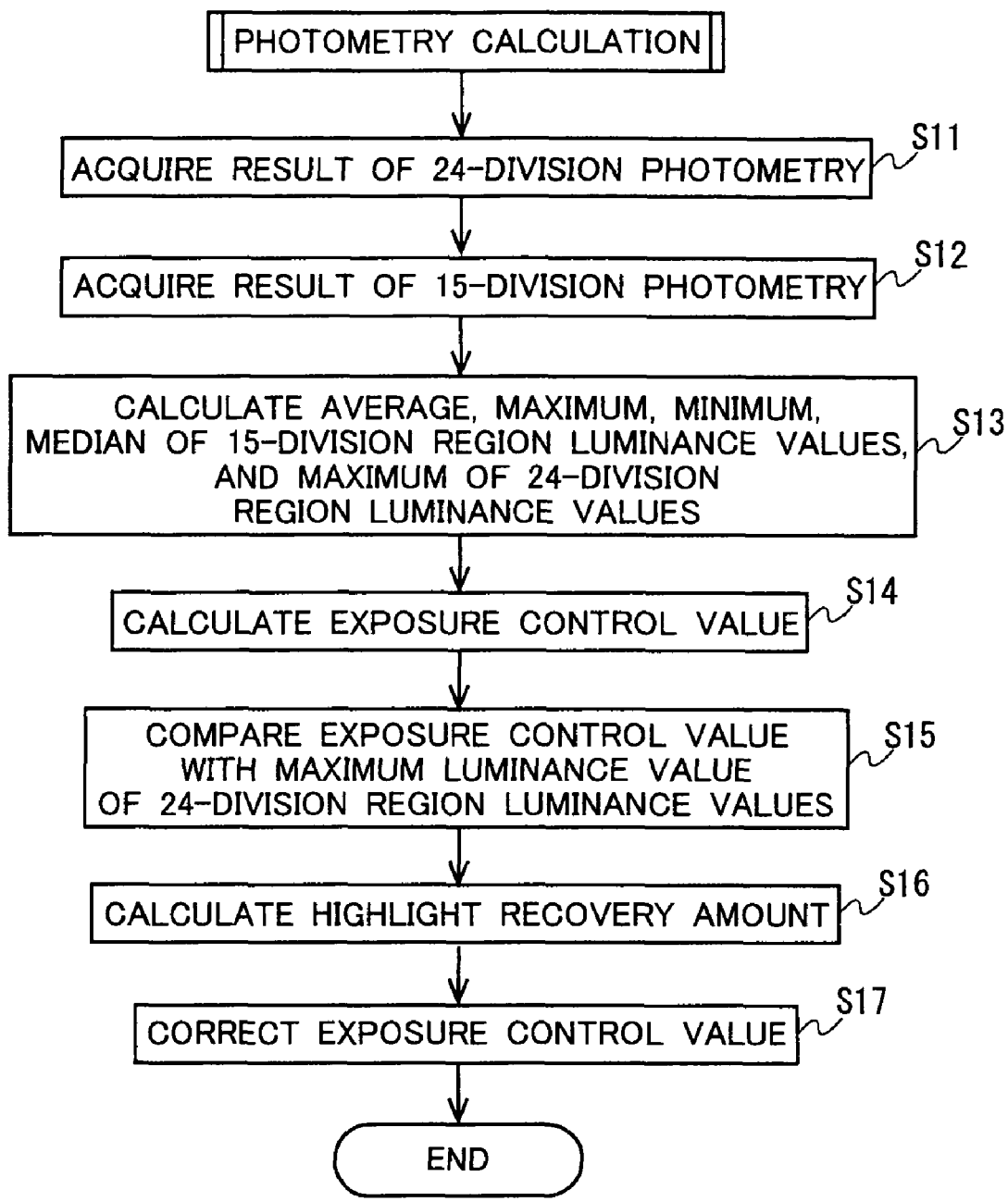
FIG. 5 is a flow chart illustrating the operation at the time of shooting by the electronic camera 1 of the first embodiment (continued).

Through Steps S31 to S37, the controlling part 19 performs a processing similar to that in Steps S11 to S17 of FIG. 5.

In Step S38, the controlling part 19 compares the exposure control value BvCntl1 calculated in Step S37 with the minimum luminance value BvMin15 of the 15-division luminance values Bv. Using the next formula, the controlling part 19 acquires dLo, i.e. the value such that the difference between the exposure control value BvCntl1 and the minimum luminance value BvMin15 of the 15-division luminance values Bv exceeds a predefined value thLo.

$$dLo = BvCntl1 - BvMin15 - thLo \quad \text{(formula 30)}$$

In formula 30, the predefined value thLo, an amount at which the shadow part of the image is estimated to be blurred, is around 2 Ev to 3 Ev, for example. The predefined value thLo is chosen as the optimum value according to the level of the image-capturing sensor 14 which is an image sensor, and the pixel size of the photometry sensor 12.

In Step S39, the controlling part 19 calculates the shadow reproduction amount LoRcv, based on the comparison result in Step S38. The controlling part 19 acquires the shadow reproduction amount LoRcv using the next formula.

$$LoRcv = \begin{cases} 0 & dLo < 0 \\ dLo & 0 \leq dLo \leq thdLo \\ thdLo & thdLo < dLo \end{cases} \quad \text{(formula 31)}$$

In formula 31, thdLo is a predefined threshold value indicating an amount at which shadow reproduction is possible, depending on the magnitude of the noise of the image-capturing sensor 14 which is an image sensor.

As shown in formula 31, the controlling part 19 clips dLo, i.e. the value acquired in Step S38 such that the difference between the exposure control value BvCntl1 and the minimum luminance value BvMin15 of the 15-division luminance values Bv exceeds a predefined value thLo, in between zero and a threshold value thdLo to provide the shadow reproduction amount LoRcv.

However, when the image-capturing sensor 14 is configured at a high ISO sensitivity, there is a risk that noise increases and a dynamic range becomes insufficient. Therefore, an upper limit may be provided on the shadow reproduction amount LoRcv acquired by formula 31 to provide a relatively small correction, when the image-capturing sensor 14 is configured at high ISO sensitivity. Alternatively, the threshold value thdLo may be set smaller when the image-capturing sensor 14 is configured at high ISO sensitivity.

In addition, when the photometry mode is the "center-weighted photometry mode" or the "spot photometry mode", other than the "divided photometry mode", a fixed value LoRcvConst is used as the shadow reproduction amount LoRcv.

Figure 6:
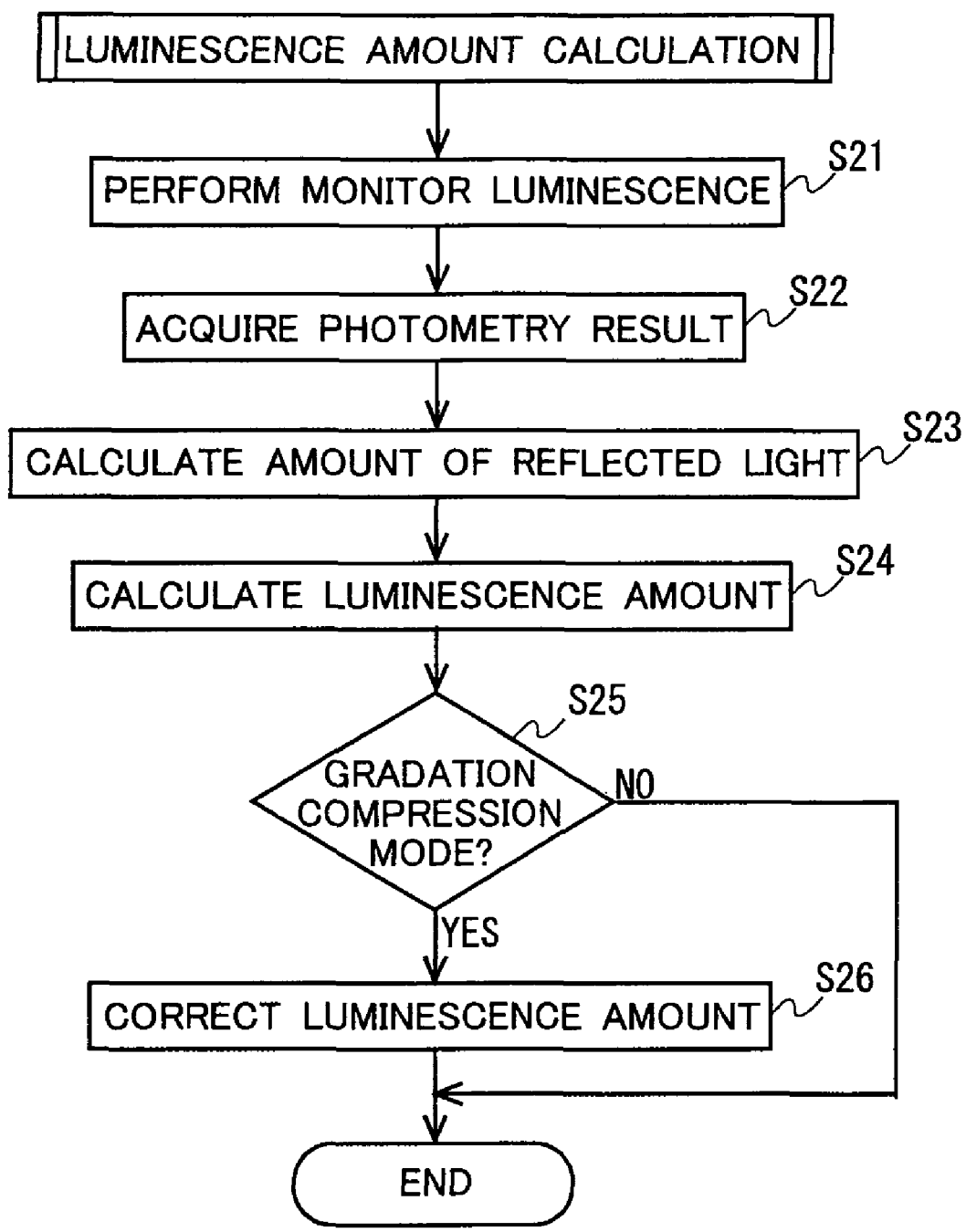
FIG. 6 is a flow chart illustrating the operation at the time of shooting by the electronic camera 1 of the first embodiment (continued).

Having performed the photometry calculation described above, the controlling part 19 performs a processing that is similar to Steps S2 and S3 of FIG. 4 of the first embodiment, and then performs calculation of the luminescence amount described in Step S4 (flow chart of FIG. 6).

In the luminescence amount calculation, the controlling part 19 performs a processing that is similar to Steps S1 to S25 of FIG. 6 of the first embodiment, and subsequently performs the following processing in place of the processing of Step S26.

The controlling part 19 corrects the luminescence amount IL calculated in Step S24, based on the shadow reproduction amount LoRcv (see Step S29 of FIG. 9) acquired in the above-mentioned photometry calculation. Correction of the luminescence amount IL is performed by the next formula.

$$IL \text{ after correction} = IL \cdot 2^{-LoRcv} \quad \text{(formula 32)}$$

In other words, correction to decrease the luminescence amount IL based on the shadow reproduction amount LoRcv is performed by correcting, according to formula 32, the luminescence amount IL calculated in Step S24.

However, there may be a case in which an actual exposure control value is different from the exposure control value BvCntl1 acquired by the above-mentioned photometry calculation (see Step S37 of FIG. 9) when shutter speed is automatically limited in order to prevent camera shake. In such a case, therefore, a fixed value LoRcvConst is used in place of the shadow reproduction amount LoRcv in formula 32. In addition, it is similar for cases such as limitation by camera shake, or strobe X contact point limitation by strobe speed of the light emission part 17.

Having performed the luminescence amount calculation described above, the controlling part 19 performs a processing similar to Steps S5 to S9 of FIG. 4 of the first embodiment.

Figure 10:
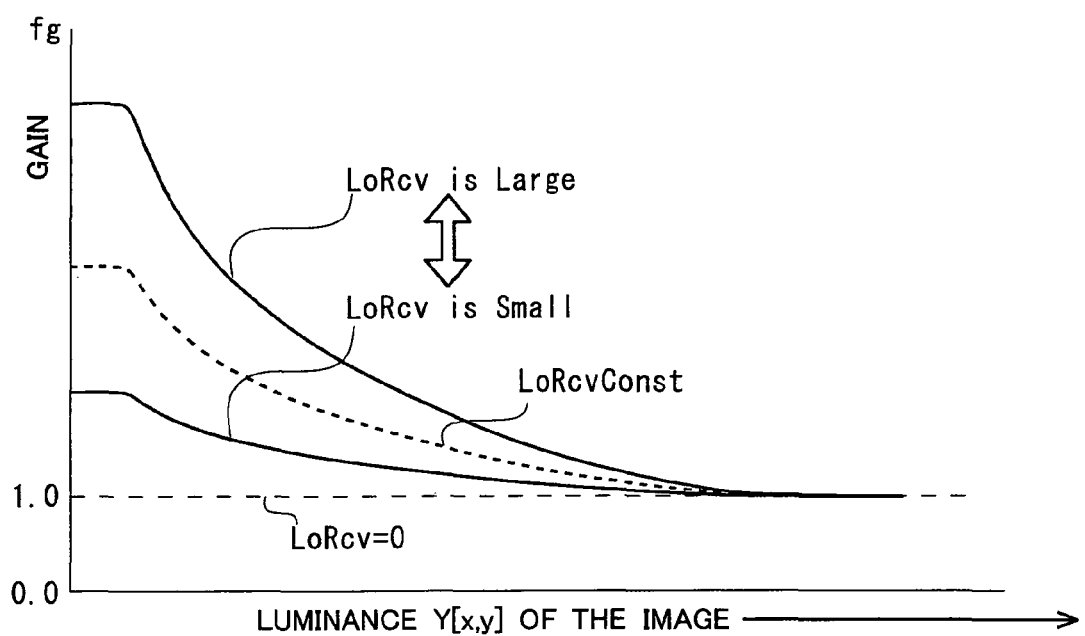
FIG. 10 is a graph showing a gain increasing function fg of gradation compression of the second embodiment.

In the gradation compression processing of Step S8, however, the gain increasing function fg shown in FIG. 10 is used in place of the gain increasing function fg shown in FIG. 7.

In FIG. 10, the gain increasing functions fg are shown for cases in which the shadow reproduction amount LoRcv is large and the shadow reproduction amount LoRcv is small. A plurality of gain increasing functions fg may be prepared in advance, depending on the shadow reproduction amount LoRcv, or only the gain increasing function fg having the largest gain increase may be prepared to remove steps, by appropriate interpolation, in the range between the gain increasing function fg having the largest gain increase and the gain of one.

In addition, if it is determined in Step S7 that the gradation compression mode has not been entered (gradation non-compression mode has been entered), the gain increasing function fg of FIG. 10 indicating LoRcv=0 is used if the gradation compression processing cannot be skipped due to configuration of the processing circuit within the controlling part 19.

As thus described, according to the second embodiment, photometry is performed with the subject being divided into a plurality of regions and a first exposure control value is calculated, based on the photometry result. Then, the first exposure control value is compared with the maximum value of the photometry values in the plurality of regions, and the first exposure control value is corrected according to the comparison result to calculate a second exposure control value. Furthermore, an image of the subject is captured depending on the second exposure control value to generate image data. Then, the second exposure control value is compared with the minimum value of photometry values in the plurality of regions and, according to the above-mentioned comparison result, the lightness improvement amount when correcting the dark area gradation of the image data generated by image capturing is calculated. Therefore, a similar effect as that of the first embodiment can be acquired.

In addition, according to the second embodiment, the photometry value to be used for comparing the first exposure control value with the maximum photometry value in a plurality of regions, and the photometry value to be used for comparing the second exposure control value with the minimum photometry value in a plurality of regions are photometry values acquired from different divided regions in the photometry unit. Therefore, a processing can be implemented assuming 100% white, totally overexposed in relatively narrow regions, whereas a processing can be implemented assuming 100% black, totally underexposed in a relatively wide regions.

Third Embodiment

In the following, a third embodiment will be described, referring to the drawings. The third embodiment is a variation of the first embodiment. Additionally, in the third embodiment, only the elements that are different from the first embodiment are described, while elements similar to those of the first embodiment will be described using similar symbols or the like as with the first embodiment.

The electronic camera of the third embodiment includes a similar configuration (see FIGS. 1 to 3) as with the electronic camera 1 described in the first embodiment.

Operation of the electronic camera 1 of the third embodiment a the time of shooting is basically similar to that of the first embodiment. In the following, only the different points will be described.

Figure 11:
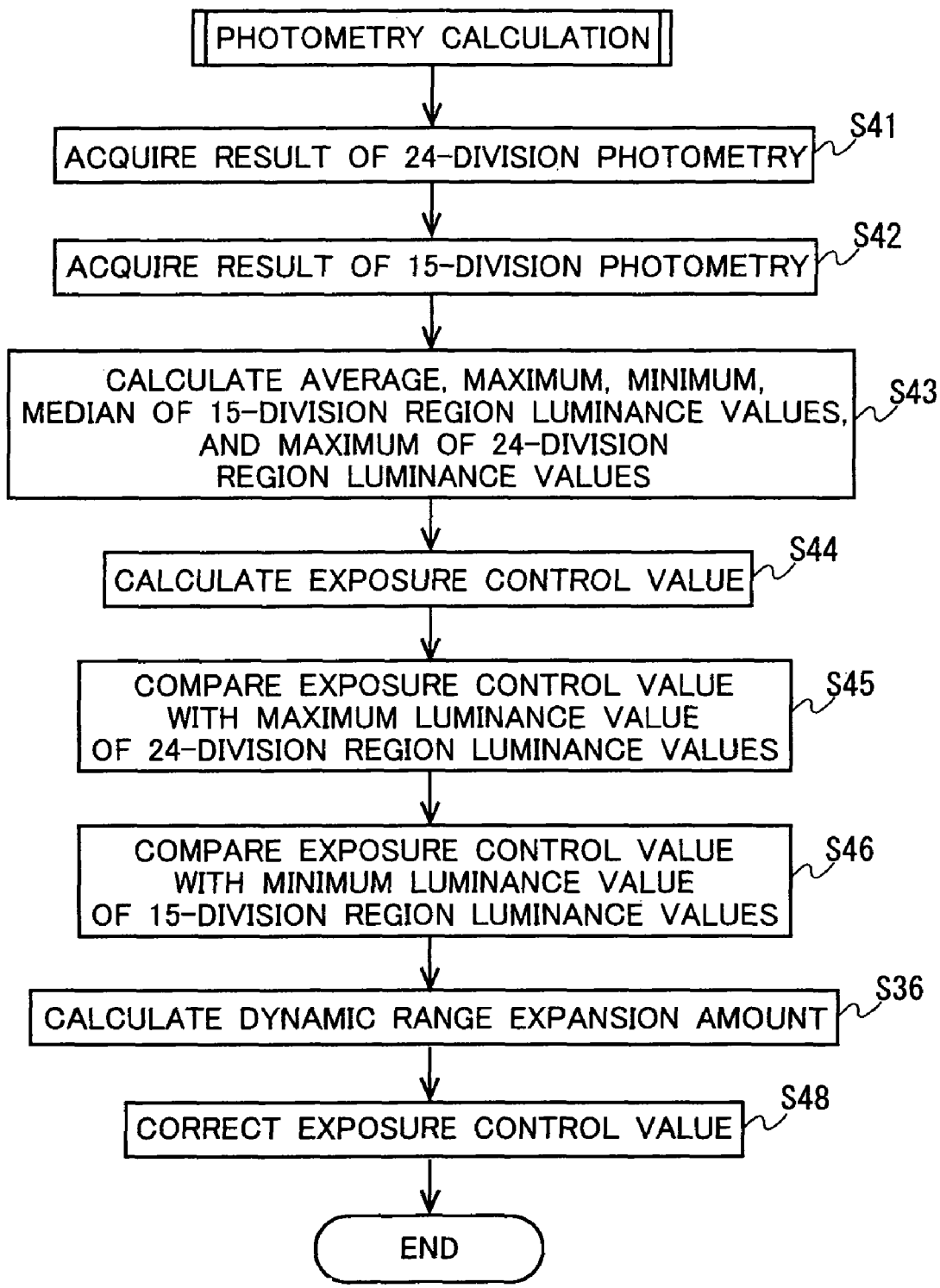
FIG. 11 is a flow chart illustrating the operation at the time of shooting by the electronic camera 1 of a third embodiment.

FIG. 11 is a flow chart illustrating the operation at the time of photometry calculation.

Through Steps S41 to S45, the controlling part 19 performs a processing similar to that in Steps S11 to S17 of FIG. 5.

In Step S46, the controlling part 19 compares the exposure control value BvCntl0 calculated in Step S44 with the minimum luminance value BvMin15 of the 15-division luminance values Bv. Using the next formula, the controlling part 19 acquires dLo, i.e. the value such that the difference between the exposure control value BvCntl0 and the minimum luminance value BvMin15 of the 15-division luminance values Bv exceeds a predefined value thLo.

$$dLo = BvCntl1 - BvMin15 - thLo \quad \text{(formula 33)}$$

In formula 33, the predefined value thLo, an amount at which the shadow part of the image is estimated to be blurred, is around 2 Ev to 3 Ev, for example. The predefined value thLo is chosen as the optimum value according to the level of the image-capturing sensor 14 which is an image sensor, and the pixel size of the photometry sensor 12.

In Step S47, the controlling part 19 calculates the dynamic range expansion amount DrRcv, based on the comparison result in Step S46. The controlling part 19 first compares dHi acquired in Step S45 with dLo acquired in Step S46 and sets the larger one as dDr.

Then, using the dDr, the controlling part 19 acquires the dynamic range expansion amount by the next formula.

$$DrRcv = \begin{cases} 0 & dDr < 0 \\ dDr & 0 \leq dDr \leq thdDr \\ thdDr & thdDr < dDr \end{cases} \quad \text{(formula 34)}$$

In formula 34, thdDr is a predefined threshold value indicating an amount which dynamic range expansion is possible, depending on the magnitude of the dynamic range of the image-capturing sensor 14 which is an image sensor.

As shown in formula 34, the controlling part 19 clips dDr, i.e. the value mentioned above in between zero and the threshold value thdDr to provide the dynamic range expansion amount DrRcv.

However, when the image-capturing sensor 14 is configured at a high ISO sensitivity, there is a risk that noise increases and a dynamic range becomes insufficient. Therefore, an upper limit may be provided on the dynamic range expansion amount DrRcv acquired by formula 34 to provide a relatively small correction, when the image-capturing sensor 14 is configured at high ISO sensitivity. Alternatively, the threshold value thdDr may be set smaller when the image-capturing sensor 14 is configured at high ISO sensitivity.

In addition, when the photometry mode is the "center-weighted photometry mode" or the "spot photometry mode", other than the "divided photometry mode", a fixed value DrRcvConst is used as the dynamic range expansion amount DrRcv.

In Step S48, the controlling part 19 corrects, based on the dynamic range expansion amount DrRcv calculated in Step S47, the exposure control value BvCntl0 calculated in Step S44. Correction of the exposure control value BvCntl0 is performed by the next formula.

Exposure control value $BvCntl1$ after correction=$BvCntl0+DrRcv$ \quad (formula 35)

However, when the photometry mode is the "center-weighted photometry mode" or the "spot photometry mode", other than the "divided photometry mode", a normal exposure control value is employed and a fixed value DrRcvConst is used as the dynamic range expansion amount DrRcv.

Having performed the photometry calculation described above, the controlling part 19 performs a processing that is similar to Steps S2 and S3 of FIG. 4 of the first embodiment, then performs calculation of the luminescence amount described in Step S4 (flow chart of FIG. 6).

In the luminescence amount calculation, the controlling part 19 performs a processing that is similar to Steps S1 to S25 of FIG. 6 of the first embodiment, and subsequently performs the following processing in place of the processing of Step S26.

The controlling part 19 corrects the luminescence amount IL calculated in Step S24, based on the dynamic range expansion amount DrRcv (see Step S47 of FIG. 10) acquired in the above-mentioned photometry calculation. Correction of the luminescence amount IL is performed by the next formula.

$IL$ after correction=$IL \cdot 2^{-DrRcv}$ \quad (formula 36)

In other words, correction to decrease the luminescence amount IL based on the dynamic range expansion amount DrRcv is performed by correcting, according to formula 36, the luminescence amount IL calculated in Step S24.

However, there may be a case in which an actual exposure control value is different from the exposure control value BvCntl1 acquired by the above-mentioned photometry calculation (see Step S48 of FIG. 10) when shutter speed is automatically limited in order to prevent camera shake. Therefore, in such a case, a fixed value DrRcvConst is used in place of the dynamic range expansion amount DrRcv in formula 32. In addition, it is similar for cases such as limitation by camera shake, or strobe X contact point limitation by strobe speed of the light emission part 17.

Having performed the luminescence amount calculation described above, the controlling part 19 performs a processing that is similar to Steps S5 to S9 of FIG. 4 of the first embodiment.

In the gradation compression processing of Step S8, however, the gain increasing function fg shown in FIG. 10 is used in place of the gain increasing function fg shown in FIG. 7.

Figure 12:
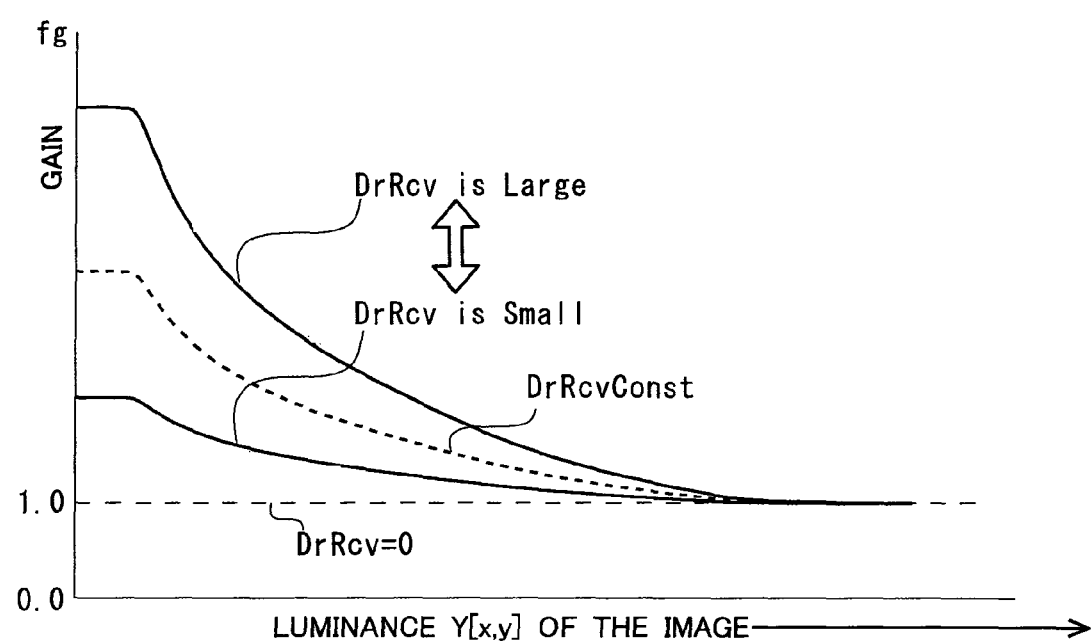
FIG. 12 is a graph showing a gain increasing function fg of gradation compression of the third embodiment.

In FIG. 12, the gain increasing functions fg are illustrate for cases in which the dynamic range expansion amount DrRcv is large and the dynamic range expansion amount DrRcv is small. A plurality of gain increasing functions fg may be prepared in advance, depending on the dynamic range expansion amount DrRcv, or only the gain increasing function fg having the largest gain increase may be prepared to remove steps, by appropriate interpolation, in the range between the gain increasing function fg having the largest gain increase and the gain of one.

In addition, when it is determined in Step S7 that the gradation compression mode has not been entered (gradation non-compression mode has been entered), the gain increasing function fg of FIG. 12 indicating DrRcv=0 is used if the gradation compression processing cannot be skipped due to configuration of the processing circuit within the controlling part 19.

As thus described, according to the third embodiment, photometry is performed with the subject being divided into a plurality of regions and a first exposure control value is calculated, based on the photometry result. Then, the first exposure control value is compared with the maximum value of the photometry values in the plurality of regions, and the first exposure control value is compared with the minimum value of photometry values in the plurality of regions. Furthermore, the first exposure control value is corrected to calculate a second exposure control value, according to the two comparison results, and an image of the subject is captured according to the second exposure control value to generate image data. Then, depending on the above-mentioned two comparison results, the lightness improvement amount when correcting the dark area gradation of the image data generated by image capturing is calculated. Therefore, a similar effect as that of the first embodiment can be acquired.

In addition, according to the third embodiment, the photometry value to be used for comparing the first exposure control value with the maximum photometry in a plurality of regions, and the photometry value to be used for comparing the second exposure control value with the minimum photometry value in a plurality of regions are photometry values acquired from different divided regions in the photometry unit. Therefore, a processing can be implemented assuming 100% white, totally overexposed in relatively narrow regions, whereas a processing can be implemented assuming 100% black, totally underexposed in a relatively wide regions.

Figure 13A:
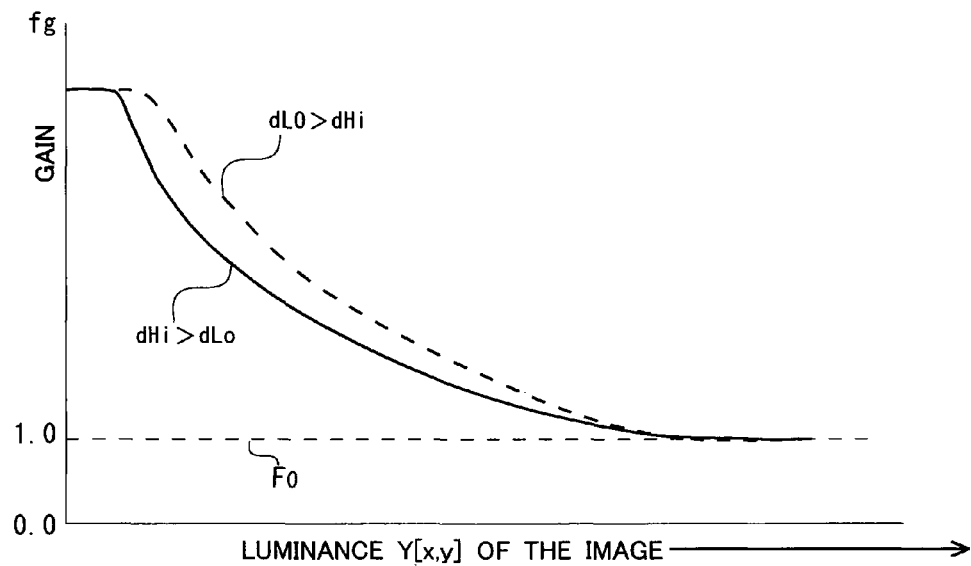
FIG. 13A illustrates another gain increasing function fg.
Figure 13B:
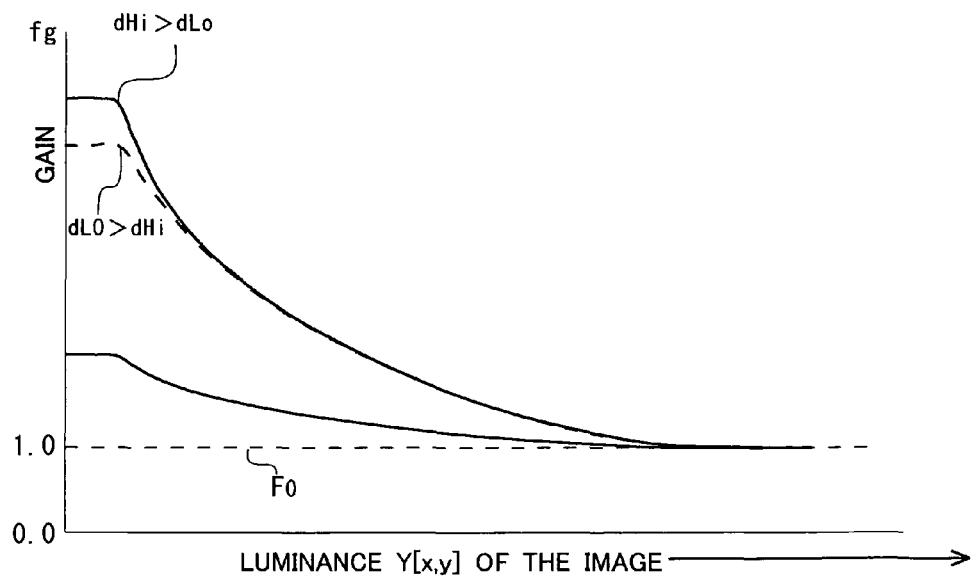
FIG. 13B illustrates another gain increasing function fg.

Here, in the third embodiment, it may be arranged such that different gain increasing functions fg are used for the case in which dHi acquired in Step S45 is larger and the case in which dLo acquired in Step S46 is larger, when acquiring the dynamic range expansion amount DrRcv in Step S47 of the flow chart of FIG. 11. For example, it may be arranged such that a gain increasing function fg having a different trend along the horizontal axis is used as shown in FIG. 13A, or a gain increasing function fg having a different trend along the vertical axis is used as shown in FIG. 13B.

Additionally, in the second and third embodiments, the threshold value thdLo relating to the highlighted side, and the threshold value thdHi relating to the shadow side does not necessarily have to be the same. For example, the threshold value thdLo relating to the highlighted side may be set somewhat larger than the threshold value thdHi relating to the shadow side.

Additionally, in each of the above-mentioned embodiments, although 24-division photometry sensors shown in FIG. 2 have been presented in the description as an example of the photometry sensor 12, the present application is not limited to this example. For example, in each of the above-mentioned embodiments, although an example of switching the number of divisions to between 24 and 15 has been presented, a fixed number of divisions may also suffice. Additionally, in each of the above-mentioned embodiments, although an example of dividing the region evenly has been presented, the region may be divided unevenly. For example, sensitivity with regard to the central portion may be increased by dividing the vicinity of the center into relatively narrow regions, while dividing the peripheral area into relatively wide regions.

Additionally, in each of the above-mentioned embodiments, an example of realizing the technology of the present application in the electronic camera 1 has been described. However, the present application is by no means limited to this example. For example, the present application can also be applied to a compact type electronic camera or a movie camera that picks up motion pictures.

In addition, the image processing described in each of the above-mentioned embodiments may be implemented as software by a computer and an image processing program. In this case, a part or all of the processing of the flow chart described in each of the above-mentioned embodiments may be implemented with a computer. In order to implement the processing with a computer, it suffices to provide the computer with information indicating whether or not the gradation compression mode has been entered or information indicating the gradation compression amount is provided, together with image data. Such information can be provided using EXIF information of image data or the like. By such an arrangement, it becomes possible to perform a processing similar to those in each of the above-mentioned embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging apparatus comprising:
a photometry unit dividing a subject into a plurality of regions and performing a photometry;
a first calculating unit calculating a first exposure control value based on a photometry result of the photometry unit;
a comparing unit comparing the first exposure control value with a maximum value of photometry values in the plurality of regions;
an estimating unit estimating a saturation amount of a highlight part of an image depending on a comparison result by the comparing unit;
a second calculating unit correcting the first exposure control value using the saturation amount being estimated by the estimating unit to calculate a second exposure control value in which an exposure control result of when using the second exposure control value is under than that of when using the first exposure control value;
an image pickup unit picking up an image of the subject according to the second exposure control value and generating an image data;
a third calculating unit calculating a lightness improvement amount for a correction of dark area gradation of the image data depending on the comparison result by the comparing unit;
a low-pass filter processing unit performing processing by a low-pass filter on the image data generated in the image pickup unit to generate a low-pass image;
a correcting unit performing a correction to improve a lightness of dark area gradation of the image data generated in the image pickup unit according to the lightness improvement amount calculated by the third calculating unit and the low-pass image; and
a recording unit recording the image data after correction by the correcting unit.

2. The imaging apparatus according to claim 1, wherein the third calculating unit provides an upper limit to the lightness improvement amount depending on an imaging sensitivity of the image pickup unit.

3. The imaging apparatus according to claim 1, further comprising:
a light emission unit illuminating a subject; and
a luminescence amount calculating unit calculating a luminescence amount for a luminescence by the light emission unit, wherein
the luminescence amount calculating unit corrects the luminescence amount depending on the lightness improvement amount calculated by the third calculating unit.

4. The imaging apparatus according to claim 1, wherein the third calculating unit sets the lightness improvement amount as a predefined fixed amount depending on a shooting condition at time of shooting by the image pickup unit.

5. The imaging apparatus according to claim 4, wherein the photometry unit selectively performs any of a plurality of photometry modes including at least one of a center-weighted photometry mode and a spot photometry mode, and
the third calculating unit sets the lightness improvement amount as the fixed amount if any of the center-weighted photometry mode and the spot photometry mode is performed at the photometry unit at time of shooting by the image pickup unit.

6. The imaging apparatus according to claim 4, further comprising
a light emission unit illuminating a subject, wherein
the third calculating unit sets the lightness improvement amount as the fixed amount if an illumination by the light emission unit is performed at time of shooting by the image pickup unit.

7. The imaging apparatus according to claim 6, wherein the light emission unit selectively performs any of a plurality of luminescence modes including at least one of a daylight synchronous mode and a slow synchronous mode, and
the third calculating unit sets the lightness improvement amount as the fixed amount if a luminescence mode other than the center-weighted photometry mode and the spot photometry mode is performed at the light emission unit at time of shooting by the image pickup unit.

8. An imaging apparatus comprising:
a photometry unit dividing a subject into a plurality of regions and performing a photometry;
a first calculating unit calculating a first exposure control value based on a photometry result of the photometry unit;
a first comparing unit comparing the first exposure control value with a maximum value of photometry values in the plurality of regions;
an estimating unit estimating a saturation amount of a highlight part of an image depending on a comparison result by the comparing unit;
a second calculating unit correcting the first exposure control value using the saturation amount being estimated by the estimating unit to calculate a second exposure control value in which an exposure control result of when using the second exposure control value is under than that of when using the first exposure control value;
an image pickup unit picking up an image of the subject according to the second exposure control value and generating an image data;
a second comparing unit comparing the second exposure control value with a minimum value of photometry values in the plurality of regions;
a third calculating unit calculating a lightness improvement amount for a correction of dark area gradation of the image data depending on the comparison result by the second comparing unit;
a low-pass filter processing unit performing processing by a low-pass filter on the image data generated in the image pickup unit to generate a low-pass image;
a correcting unit performing a correction to improve a lightness of dark area gradation of the image data generated in the image pickup unit according to the lightness improvement amount calculated by the third calculating unit and the low-pass image; and
a recording unit recording the image data after correction by the correcting unit.

9. The imaging apparatus according to claim 8, wherein the photometry value used for a comparison in the first comparing unit and the photometry value used for a comparison in the second comparing unit are photometry values acquired from different divided regions at the photometry unit.

10. An imaging apparatus comprising:
a photometry unit dividing a subject into a plurality of regions and performing a photometry;
a first calculating unit calculating a first exposure control value based on a photometry result of the photometry unit;

a first comparing unit comparing the first exposure control value with a maximum value of photometry values in the plurality of regions;

a second comparing unit comparing the first exposure control value with a minimum value of photometry values in the plurality of regions;

an estimating unit estimating a saturation amount of a highlight part of an image depending on a comparison result by the comparing unit and a comparison result by the second comparing unit;

a second calculating unit correcting the first exposure control value using the saturation amount being estimated by the estimating unit to calculate a second exposure control value in which an exposure control result of when using the second exposure control value is under than that of when using the first exposure control value;

an image pickup unit picking up an image of the subject according to the second exposure control value and generating an image data;

a third calculating unit calculating a lightness improvement amount for a correction of dark area gradation of the image data depending on the comparison result by the first comparing unit and the comparison result by the second comparing unit a low-pass filter processing unit performing processing by a low-pass filter on the image data generated in the image pickup unit to generate a low-pass image;

a correcting unit performing a correction to improve a lightness of dark area gradation of the image data generated in the image pickup unit according to the lightness improvement amount calculated by the third calculating unit and the low-pass image; and a recording unit recording the image data after correction by the correcting unit.

* * * * *